Aug. 16, 1927.
A. F. MASURY ET AL
1,638,947
UNIVERSAL JOINT
Filed Oct. 7, 1922 2 Sheets-Sheet 2
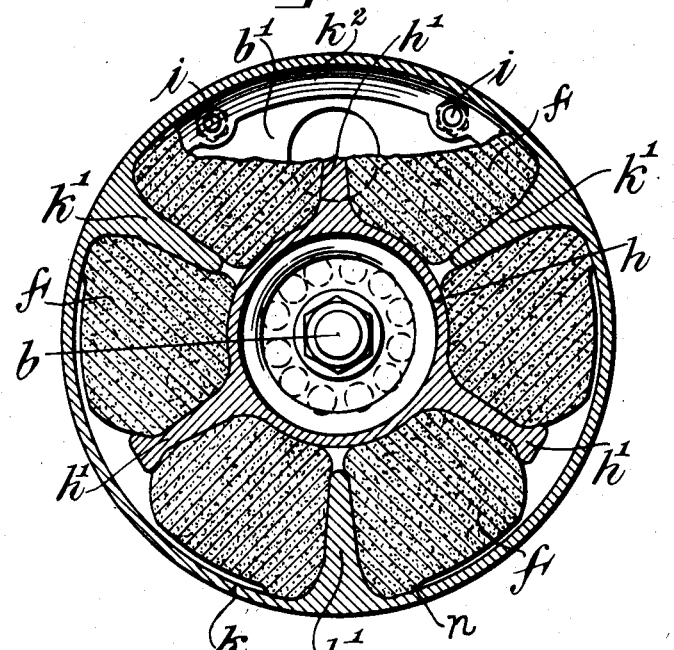
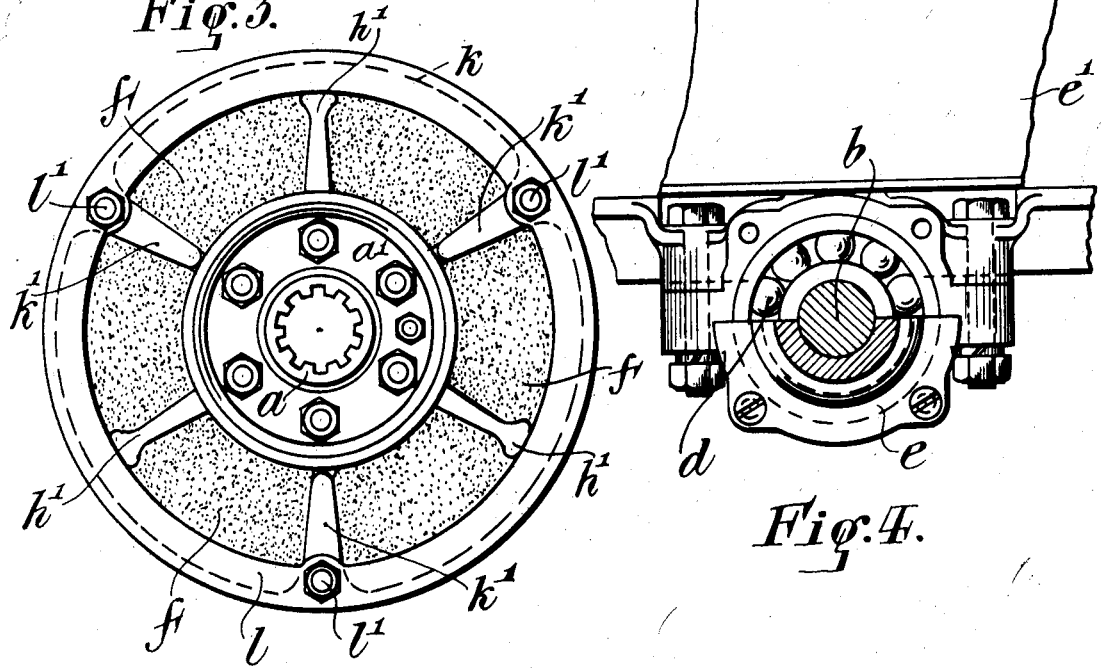
INVENTOR
Alfred F. Masury.
August H. Leipert.
BY
ATTORNEYS Patented Aug. 16, 1927.

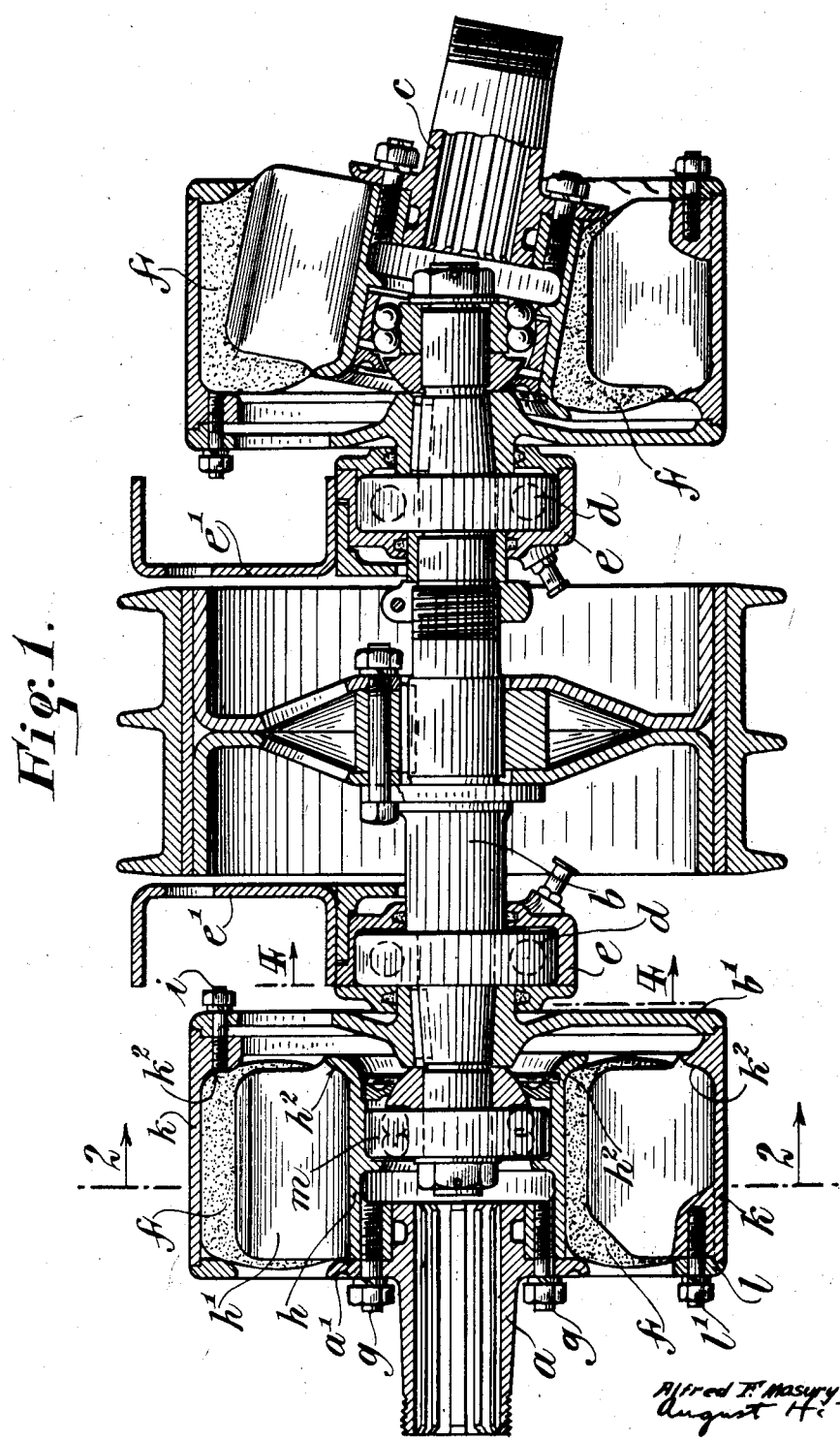

1,638,947

UNITED STATES PATENT OFFICE.

ALFRED F. MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

UNIVERSAL JOINT.

Application filed October 7, 1922. Serial No. 592,942.

This invention relates to universal joints especially adapted for use in motor vehicles and has for its general object to provide a joint in which metal to metal engagement between the elements is eliminated with the resulting wear, noise and problems of lubrication found in metallic joints. A further object of the invention is to provide a construction which is simple and compact and lends itself readily to assembling and disassembling. In accordance with the invention it is proposed to incorporate between the driving and driven elements non-metallic yielding units through which the turning stresses are transmitted and which by reason of their physical properties conform readily to angular changes in the connected shafts. The material proposed in the preferred embodiment is rubber which is interposed between the driving and driven elements in the form of molded blocks which are assembled under compression. Seats for the blocks are provided on the metallic parts although at no point are stresses transmitted through metal to metal contact.

Reference is now to be had to the accompanying drawings for a detailed description of one suitable embodiment of the invention in which:

Figure 1 is a view in longitudinal section through a propeller shaft of a motor vehicle and showing two joints incorporated therein, one being illustrated with the shafts in alinement and the other being illustrated with the shafts angularly displaced.

Figure 2 is a view in transverse section through one of the joints shown in Figure 1 and taken on the plane indicated by the line 2—2 and looking in the direction of the arrows.

Figure 3 is a view in end elevation showing one of the joints illustrated in Figure 1.

Figure 4 is a view in transverse section through one of the shaft sections illustrated in Figure 1 and taken on the plane indicated by the arrows and showing the hangers for the joints.

It will be understood as the description proceeds that the invention is not to be limited to the particular location of the improved joint nor to the number employed in shafting although, for convenience, there has been shown in the accompanying drawings a conventional form of automobile construction in which two joints are incorporated in the propeller shaft. Power may be assumed to be applied from a driving shaft section through a splined hub $a$ and delivered through a short shaft section $b$ to a driven shaft section leading to the rear end and engaged with the splined hub $c$. The section $b$ may be supported in anti-friction bearings $d$ carried in hangers $e$ supported on transverse channels $e'$ extending between the side frame members of the chassis. Since the two joints illustrated in Figure 1 are identical and the parts interchangeable and power may be led through either one in either direction it will be sufficient to describe first the joint shown at the left. Considering the hub $a$ as the driving member and the shaft section $b$ as the driven member it is proposed to transmit power from one to the other through non-metallic units thereby eliminating wear and noise and problems of lubrication found in metallic joints where metal to metal engage. To this end, it is proposed to transmit the power through non-metallic yielding blocks $i$ which, it has been found, may be molded of rubber. It is proposed to interpose these blocks operatively between the elements $a$ and $b$ so as to transmit the driving power and yet permit angular displacement with respect to the axes of the elements. Any suitable means may be employed for affording abutments or seats for the units $i$ on the two elements $a$, $b$, the construction in the drawings being merely illustrative of one suitable design. As shown, the hub $a$ has an annular flange $a'$ formed therewith on the inner face of which is bolted, as by bolts $g$ a ring $h$ provided with radial vanes $h'$ spaced at intervals to afford seats for the several units $i$, respectively. The proximate end of the shaft section $b$ has keyed thereon a spider $b'$ to which is bolted, as by bolts $i''$ an annular carrier $k$ having inwardly extending vanes $k'$ which may be disposed between the vanes $h'$ and afford seats for the several units $i$. It will be noticed that both the ring $h$ and the ring $k$ are specially formed to provide seats $h^2$, $k^2$, respectively, to confine the blocks $i$. The flange $a'$, cooperates with the seats $h^2$ to confine the blocks at their outer sides. A retaining ring

*l* may be bolted to the ring *h* as by bolts *l'* to co-operate with the seat *k*² to confine the blocks at their outer sides and edges.

The shaft section *b* extends within the ring *h* and carries a self-alining bearing *m* whose outer race seats within the ring *h*. The center of turning of this bearing is disposed coincident with the center of turning of the elements *a* and *b* angularly with respect to one another so that when the two shafts assume angular positions as indicated at the right in Figure 1 they remain self-centered with respect to the joint and their axes intersect.

In using molded rubber to do mechanical work it has been found that it should be confined under compression. In assembling the joint described, therefore, provision has been made whereby the blocks may be introduced between the vanes *k'*, *h'*, successively and all of the blocks ultimately confined under compression. Referring to Figure 2 it will be evident that the vanes *h'* may be so disposed with respect to the vanes *k'* as to admit the blocks therebetween, one at a time, the ring *h* being turned angularly with respect to the ring *k* as much as necessary to compress the blocks previously introduced and increase the space between each pair of vanes between which blocks are to be introduced. When the last block is finally introduced and the parts released it will be found that all of the blocks are seated under compression.

The manner of assembling will be evident to one skilled in the art in view of the detailed description given of the various parts which are to be bolted together. In use, when the shafts assume angular position as indicated at the right in Figure 1 the non-metallic yielding blocks *i* conform to the angular movement and "flow" to an extent sufficient to adapt themselves to this angularity while, nevertheless, remaining under compression and being interposed operatively between adjacent vanes *h'*, *k'*, and transmitting the turning effort from one to the other without necessitating contact at any point of metal to metal. The protuberances *n* on the blocks of rubber bear against the seat on the inner surface of the outer cylindrical member. They serve to maintain the main bearing portion of the block of rubber out of normal engagement with its seat on the outer cylindrical member. When, however, the block is transmitting force and a resulting flow thereof takes place, the outer surface will eventually bear against the seat. This will take place after a predetermined flow so that, during relative movement of the outer portion of the block with respect to the outer ring, there will be no rubbing therebetween, and when the block seats on the ring, it will do so under compression only. Chafing of the block is thus eliminated.

Lubrication is unnecessary and the hard wear on metallic elements with the resulting noise and looseness is prevented. The joint is wholly self-centering and efficient in use.

As indicated hereinbefore, the design so far as concerns the metallic units may be changed without departing from the spirit of the invention so long as the broad results described are secured through the interposition between the metallic parts of non-metallic conforming units.

What we claim is:

1. In a universal joint the combination with angular shaft sections between which driving torque is to be transmitted, of a connection therebetween comprising an inner cylindrical member of substantial length carried with an end of one shaft section and having outwardly extending radial fins, a spider carried with the proximate end of another shaft section, an outer cylindrical member of substantial length carried with the spider and having inwardly extending radial fins spaced from but disposed in overlapping relationship with the first named fins, seats formed on the opposed surfaces of both of the cylindrical members between the fins, blocks of yielding non-metallic material interposed between opposed fins and between co-operating seats in the respective cylindrical members and retaining rings secured to the cylindrical members, respectively, to retain the blocks in position.

2. In a universal joint the combination with angular shaft sections between which driving torque is to be transmitted, of a connection therebetween comprising an inner cylindrical member of substantial length carried with an end of one shaft section and having outwardly extending radial fins, a spider carried with the proximate end of another shaft section, an outer cylindrical member of substantial length carried with the spider and having inwardly extending radial fins spaced from but disposed in overlapping relationship with the first named fins, seats formed on the opposed faces of both of the cylindrical members between the fins, and blocks of yielding non-metallic material interposed between opposed fins and between co-operating seats in the respective cylindrical members, said blocks being provided with protuberances along a portion of their sides which seat on the outer ring.

3. In a universal joint, the combination with angular shaft sections between which driving torque is to be transmitted, of a connection therebetween comprising an inner cylindrical member of substantial length carried with an end of one shaft section, said member having outwardly extending radial fins and seats formed on its outer cylindrical surface between the fins, a spider carried with the proximate end of another shaft section, an outer cylindrical member of substantial length carried with the spider, said second named member having inwardly extending fins and seats formed on its inner cylindrical surface between the fins, said second named fins being spaced from but disposed in overlapping relationship with the first named fins, and blocks of yielding non-metallic material confined under compression between opposed fins and between the seats formed on the outer and inner surfaces, respectively, of the inner and outer cylindrical members, said blocks being capable of distortion by the fins to provide for rotative movements between the shafts and. by the seats on the cylindrical members to provide for angularity between the shafts.

4. In a universal joint, the combination with angular shaft sections between which driving torque is to be transmitted, of a connection therebetween comprising an inner cylindrical member of substantial length carried with an end of one shaft section, said member having outwardly extending radial fins and seats formed on its outer cylindrical surface between the fins, a spider carried with the proximate end of another shaft section, an outer cylindrical member of substantial length carried with the spider, said second named member having inwardly extending fins and seats formed on its inner cylindrical surface between the fins, said second named fins being spaced from but disposed in overlapping relationship with the first named fins, blocks of yielding non-metallic material confined under compression between opposed fins and between the seats formed on the outer and inner surfaces, respectively, of the inner and outer cylindrical members, said blocks being capable of distortion by the fins to provide for rotative movements between the shafts and by the seats on the cylindrical members to provide for angularity between the shafts, and removable retaining rings for co-operation with the ends of the cylindrical members, respectively, to retain the blocks in position when assembled, said removable retaining rings providing for assembling the blocks under compression between the fins and the seats by inserting them axially of the cylindrical members.

This specification signed this 30 day of September, A. D. 1922.

ALFRED F. MASURY.
AUGUST H. LEIPERT.